United States Patent
Das et al.

(10) Patent No.: US 12,160,482 B2
(45) Date of Patent: Dec. 3, 2024

(54) APPARATUS, METHODS, AND COMPUTER PROGRAMS

(71) Applicant: Nokia Technologies Oy, Espoo (FI)

(72) Inventors: Prashanti Das, Bangalore (IN); Bruno Landais, Pleumeur-Bodou (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 181 days.

(21) Appl. No.: 17/571,757

(22) Filed: Jan. 10, 2022

(65) Prior Publication Data

US 2022/0247827 A1 Aug. 4, 2022

(30) Foreign Application Priority Data

Jan. 29, 2021 (IN) .............................. 202141004052

(51) Int. Cl.
*H04L 67/51* (2022.01)
*H04L 12/14* (2006.01)
*H04L 67/566* (2022.01)

(52) U.S. Cl.
CPC .......... *H04L 67/51* (2022.05); *H04L 12/1425* (2013.01); *H04L 67/566* (2022.05)

(58) Field of Classification Search
CPC .... H04L 67/51; H04L 67/566; H04L 12/1425
See application file for complete search history.

(56) References Cited

U.S. PATENT DOCUMENTS

| | | |
|---|---|---|
| 10,833,938 B1 | 11/2020 | Rajput et al. |
| 10,855,851 B2 | 12/2020 | Qiao et al. |
| 2010/0188975 A1 | 7/2010 | Raleigh |
| 2012/0123914 A1* | 5/2012 | Sharma ................. H04M 15/53 705/30 |
| 2014/0011472 A1 | 1/2014 | Sharma et al. |
| 2017/0257301 A1 | 9/2017 | Li |

(Continued)

FOREIGN PATENT DOCUMENTS

| | | |
|---|---|---|
| CN | 102365840 A | 2/2012 |
| CN | 102638355 A | 8/2012 |

(Continued)

OTHER PUBLICATIONS

"3rd Generation Partnership Project; Technical Specification Group Core Network and Terminals; 5G System; Technical Realization of Service Based Architecture; Stage 3 (Release 17)", 3GPP TS 29.500, V17.1.0, Dec. 2020, pp. 1-90.

(Continued)

*Primary Examiner* — Duc C Ho
(74) *Attorney, Agent, or Firm* — ALSTON & BIRD LLP

(57) ABSTRACT

An aspect of the disclosed invention provides a network apparatus for a network function, the network apparatus comprising: at least one processor; and at least one memory comprising code that, when executed by the at least one processor, causes the network apparatus to: in response to a request from a service consumer, determine a first network service function for providing services to the service consumer; determine an identity of a second network service function, wherein the second network service function is an alternative or backup network service function to provide the service to the service consumer; and provide the service consumer with the identity of the second network service function.

19 Claims, 7 Drawing Sheets

(56) References Cited

U.S. PATENT DOCUMENTS

| | | | |
|---|---|---|---|
| 2019/0116521 A1 | 4/2019 | Qiao et al. | |
| 2019/0306251 A1 | 10/2019 | Talebi Fard et al. | |
| 2020/0007632 A1 | 1/2020 | Landais et al. | |
| 2020/0092423 A1* | 3/2020 | Qiao | H04W 80/10 |
| 2020/0267530 A1 | 8/2020 | Bartolomé Rodrigo et al. | |
| 2020/0404608 A1 | 12/2020 | Albasheir et al. | |
| 2021/0258406 A1* | 8/2021 | Ali | H04W 68/005 |

FOREIGN PATENT DOCUMENTS

| | | |
|---|---|---|
| CN | 110999346 A | 4/2020 |
| EP | 2870746 B1 | 8/2018 |
| WO | WO 2020/002761 A1 | 1/2020 |
| WO | 2020/156685 A1 | 8/2020 |
| WO | WO 2020/202043 A1 | 10/2020 |

OTHER PUBLICATIONS

"3rd Generation Partnership Project; Technical Specification Group Core Network and Terminals; 5G System; Network Function Repository Services; Stage 3 (Release 17)", 3GPP TS 29.510, V17.0.0, Dec. 2020, pp. 1-229.

"3rd Generation Partnership Project; Technical Specification Group Services and System Aspects; System architecture for the 5G System (5GS); Stage 2 (Release 16)", 3GPP TS 23.501, V16.7.0, Dec. 2020, pp. 1-450.

"3rd Generation Partnership Project; Technical Specification Group Services and System Aspects; Procedures for the 5G System (5GS); Stage 2 (Release 16)", 3GPP TS 23.502, V16.7.0, Dec. 2020, pp. 1-603.

Fielding et al., "Hypertext Transfer Protocol (HTTP/1.1): Message Syntax and Routing", RFC 7230, Internet Engineering Task Force (IETF), Jun. 2014, pp. 1-89.

"3rd Generation Partnership Project; Technical Specification Group Services and System Aspects; Telecommunication management; Charging management; 5G system, charging service; Stage 3 (Release 16)", 3GPP TS 32.291, V16.6.1, Dec. 2020, pp. 1-131.

"3rd Generation Partnership Project; Technical Specification Group Services and System Aspects; Telecommunication management; Charging management; 5G system; Services, operations and procedures of charging using Service Based Interface (SBI) (Release 16)", 3GPP TS 32.290, V16.3.0, Dec. 2019, pp. 1-34.

"3rd Generation Partnership Project; Technical Specification Group Services and System Aspects; Management and orchestration; 5G Network Resource Model (NRM); Stage 2 and stage 3 (Release 16)", 3GPP TS 28.541, V16.3.0, Dec. 2019, pp. 1-327.

"3rd Generation Partnership Project; Technical Specification Group Services and System Aspects; Procedures for the 5G System (5GS); Stage 2 (Release 16)", 3GPP TS 23.502 v16.7.1, (Jan. 2021), 603 pages.

Office Action for Chinese Application No. 202210088529.8 dated Aug. 23, 2023, 13 pages.

Office Action for European Application No. 22151140.5 dated Aug. 18, 2023, 8 pages.

Extended European Search Report for European Application No. 22151140.5 dated Jun. 1, 2022, 13 pages.

China Mobile, "AUSF/UDM Discovery Based SUCI Information", SA WG2 Meeting #141E (e-meeting), S2-2009337, (Nov. 16-20, 2020), 13 pages.

Nokia Siemens Networks, "Editorial Clean-Up", 3GPP TSG-SA5 (Telecom Management) Meeting SA5#68, Change Request 32.299, S5-093749, (Nov. 9-13, 2009), 11 pages.

Office Action for Chinese Application No. 202210088529.8 dated Mar. 27, 2024, 11 pages.

Office Action for European Application No. 22151140.5 dated Mar. 27, 2024, 8 pages.

\* cited by examiner

APPARATUS, METHODS, AND COMPUTER PROGRAMS

CROSS REFERENCE TO RELATED APPLICATION

This application claims priority to Indian patent application Ser. No. 202141004052, filed Jan. 29, 2021, the entire contents of which are hereby incorporated by reference.

FIELD

The present disclosure relates to apparatus, methods, and computer programs, and in particular but not exclusively to apparatus, methods and computer programs for network apparatuses.

BACKGROUND

A communication system can be seen as a facility that enables communication sessions between two or more entities such as user terminals, access nodes and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known is the long-term evolution (LTE) or the Universal Mobile Telecommunications System (UMTS) radio-access technology. Another example communication system is so called 5G system that allows user equipment (UE) or user device to contact a 5G core via e.g. new radio (NR) access technology or via other access technology such as Untrusted access to 5GC or wireline access technology.

SUMMARY

According to an aspect, there is provided A network apparatus for a network function, the network apparatus comprising: means for, in response to a request from a service consumer, determining a first network service function for providing services to the service consumer; means for determining a second network service function, wherein the second network service function is an alternative or backup network service function to provide the service to the service consumer; and means for providing the service consumer with an identity of the second network service function.

The first and second network service functions may comprise first and second charging functions. The means for determining may comprise means for determining the first and second charging functions. The service may comprise a charging service.

Said means for determining the second charging function may comprise means for sending a charging request for said charging services to the first charging function; and means for receiving, from the first charging function, the identity of the second charging function, and an indication that the second charging function is an alternative charging function for the said charging services.

Said means for determining the second network service function may comprise means for sending a discovery request for a network service function to a network repository function and means for receiving, from the network repository function, at least the identity of the first network service function, the identity of the second network service function, and an indication that the second network service function is an alternative to the first network service function.

Said means for providing the service consumer with the identity of the first network service function and the identity of the second network service function may comprise means for inserting the identity of the second network service function into a header of a message; and means for sending the message to the service consumer. The second network service function may be explicitly indicated as being a backup network service function to the first network service function in said header. Said message may be a charging data response received from the first network service function comprising a first charging function.

In accordance with another aspect there is provided a network apparatus for a service consumer, the network apparatus comprising: means for sending a request to a network function for selecting a first network service function to provide charging services to the service consumer; and means for receiving, in response to said request, an identity of a second network service function, wherein the second network service function is an alternative or backup network service function to provide the service to the service consumer.

Said identity of the first network service function and the identity of a second network service function may be comprised within a header of the response to said request. The second network service function may explicitly be indicated as being a backup network service function to the first network service function in said header.

The network apparatus may further comprise means for receiving an indication that the first network service function is unable to provide said services to the service consumer; and means for, in response to receiving said indication, directing at least one future request for a service to the second network service function.

The network function may comprise a Service Communication Proxy.

The first and second network service functions may comprise first and second charging functions and the service may comprise a charging service.

In accordance with a further aspect a network apparatus for a first network service function is provided, the network apparatus comprising: means for receiving a request to provide services to a service consumer; and means for responding to said request with an identity of a second network service function, wherein the second network service function is an alternative or backup network service function to provide the service to the service consumer.

The identity of the second network service function may be comprised in a header comprising an identity of the first network service function.

In accordance with a further aspect there is provided a method for a network apparatus for a network function, the method comprising: in response to a request from a service consumer, determining a first network service function for providing services to the service consumer; determining a second network service function, wherein the second network service function is an alternative or backup network service function to provide the service to the service consumer; and providing the service consumer with an identity of the second network service function.

In accordance with a further aspect there is provided a method for a network apparatus for a service consumer, the method comprising: sending a request to a network function for selecting a first network service function to provide services to the service consumer; and receiving, in response to said request, an identity of a second network service function, wherein the second network service function is an alternative or backup network service function to provide the service to the service consumer.

In accordance with a further aspect there is provided a method for a network apparatus for a first network service function, the method comprising: receiving a request to provide services to a service consumer; and responding to said request with an identity of a second network service function, wherein the second network service function is an alternative or backup network service function to provide the service to the service consumer.

In accordance with a further aspect there is provided a computer program product comprising computer code that, when executed by at least one processor of network apparatus for a network function, causes the network apparatus to perform: in response to a request from a service consumer, determining a first network service function for providing services to the service consumer; determining a second network service function, wherein the second network service function is an alternative or backup network service function to provide the service to the service consumer; and providing the service consumer with an identity of the second network service function.

In accordance with a further aspect there is provided a computer program product comprising computer code that, when executed by at least one processor of network apparatus for a service consumer, causes the network apparatus to perform: sending a request to a network function for selecting a first network service function to provide services to the service consumer; and receiving, in response to said request, an identity of a second network service function, wherein the second network service function is an alternative or backup network service function to provide the service to the service consumer.

In accordance with a further aspect there is provided a computer program product comprising computer code that, when executed by at least one processor of network apparatus for a first network service function, causes the network apparatus to perform: receiving a request to provide services to a service consumer; and responding to said request with an identity of a second network service function, wherein the second network service function is an alternative or backup network service function to provide the service to the service consumer.

According to an aspect, there is provided a network apparatus for a network function, the network apparatus comprising: at least one processor; and at least one memory comprising code that, when executed by the at least one processor, causes the network apparatus to: in response to a request from a service consumer, determine a first network service function for providing services to the service consumer; determine an identity of a second network service function, wherein the second network service function is an alternative or backup network service function to provide the service to the service consumer; and provide the service consumer with the identity of the second network service function.

Said determining an identity of the second network service function may comprise: sending a discovery request for a charging function to a network repository function; and receiving, from the network repository function, at least the identity of a first charging function, the identity of a second charging function, and an indication that the second charging function is an alternative to the first charging function.

Said determining an identity of the second charging function may comprise: sending a charging request for said charging services to the first charging function; and receiving, from the first charging function, the identity of the second charging function, and an indication that the second charging function is an alternative charging function for the said charging services.

Said providing the service consumer with the identity of the first charging function and the identity of the second charging function may comprise: inserting the identity of the second charging function into a header of a message, the header further comprising the identity of the first charging function; and sending the message to the service consumer.

The second charging function may be explicitly indicated as being a backup charging function to the first charging function in said header.

Said message may be a charging data response received from the first charging function.

The network function may be a Service Communication Proxy.

The identity of the second charging function may be comprised in a header comprising an identity of the first charging function.

According to an aspect, there is provided a network apparatus for a service consumer, the network apparatus comprising: at least one processor; and at least one memory comprising code that, when executed by the at least one processor, causes the network apparatus to: send a request to a network function for selecting a first network service function to provide services to the service consumer; and receive, in response to said request, an identity of a second network service function, wherein the second network service function is an alternative or backup network service function to provide a service to the service consumer.

The service may be a charging service provided by a charging function. Identity of a first charging function and the identity of a second charging function may be comprised within a header of the response to said request. The second charging function may be explicitly indicated as being a backup charging function to the first charging function in said header.

The network apparatus may be caused to: receive an indication that the first charging function is unable to provide said charging services to the service consumer; and, in response to receiving said indication, direct at least one future request for a charging service to the second charging function.

The network function may be a Service Communication Proxy.

The identity of the second charging function may be comprised in a header comprising an identity of the first charging function.

According to an aspect, there is provided a network apparatus for a first network service function, the network apparatus comprising: at least one processor; and at least one memory comprising code that, when executed by the at least one processor, causes the network apparatus to: receive a request to provide services to a service consumer; and responding to said request with an identity of a second network service function, wherein the second network service function is an alternative or backup network service function to provide the service to the service consumer.

As above, the service may be a charging service provided by a charging function. The identity of a second charging function may be comprised in a header comprising an identity of a first charging function.

According to an aspect, there is provided a method for a network apparatus for a network function, the method comprising: in response to a request from a service consumer, selecting a first charging function for providing charging services to the service consumer; determining an identity of a second charging function, wherein the second charging function is an alternative or backup charging function to provide the charging service to the service consumer; and providing the service consumer with the identity of the second charging function.

According to an aspect, there is provided a method for a network apparatus for a service consumer, the method comprising: sending a request to a network function for determining a first charging function to provide charging services to the service consumer; and receiving, in response to said request, an identity of a second charging function, wherein the second charging function is an alternative or backup charging function to provide the charging service to the service consumer.

According to an aspect, there is provided a method a network apparatus for a first charging function, the method comprising: receiving a request to provide services to a service consumer; and responding to said request with an identity of a second charging function, wherein the second charging function is an alternative or backup charging function to provide the charging service to the service consumer.

According to an aspect, there is provided a network apparatus for a network function, the network apparatus comprising: determining circuitry for, in response to a request from a service consumer, determining a first charging function for providing charging services to the service consumer; determining circuitry for determining an identity of a second charging function, wherein the second charging function is an alternative or backup charging function to provide the charging service to the service consumer; and providing circuitry for providing the service consumer with the identity of the second charging function.

According to an aspect, there is provided a network apparatus for a service consumer, the network apparatus comprising: sending circuitry for sending a request to a network function for selecting a first charging function to provide charging services to the service consumer; and receiving circuitry for receiving, in response to said request, an identity of a second charging function, wherein the second charging function is an alternative or backup charging function to provide the charging service to the service consumer.

According to an twelfth, there is provided a network apparatus for a first charging function, the network apparatus comprising: receiving circuitry for receiving a request to provide services to a service consumer; and responding circuitry for responding to said request with an identity of a second charging function, wherein the second charging function is an alternative or backup charging function to provide the charging service to the service consumer.

A non-transitory computer readable medium comprising program instructions for causing a network apparatus to perform the herein described method can also be provided.

BRIEF DESCRIPTION OF FIGURES

Examples will now be described, by way of example only, with reference to the accompanying Figures in which.

DETAILED DESCRIPTION

In the following, certain aspects are explained with reference to mobile communication devices capable of communication via a wireless cellular system and mobile communication systems serving such mobile communication devices. For brevity and clarity, the following describes such aspects with reference to a 5G wireless communication system. However, it is understood that such aspects are not limited to 5G wireless communication systems, and may, for example, be applied to other wireless communication systems with analogous components (for example, current 6G proposals).

Before explaining in detail the exemplifying embodiments, certain general principles of a 5G wireless communication system are briefly explained with reference to FIG. 1.

Figure 1:
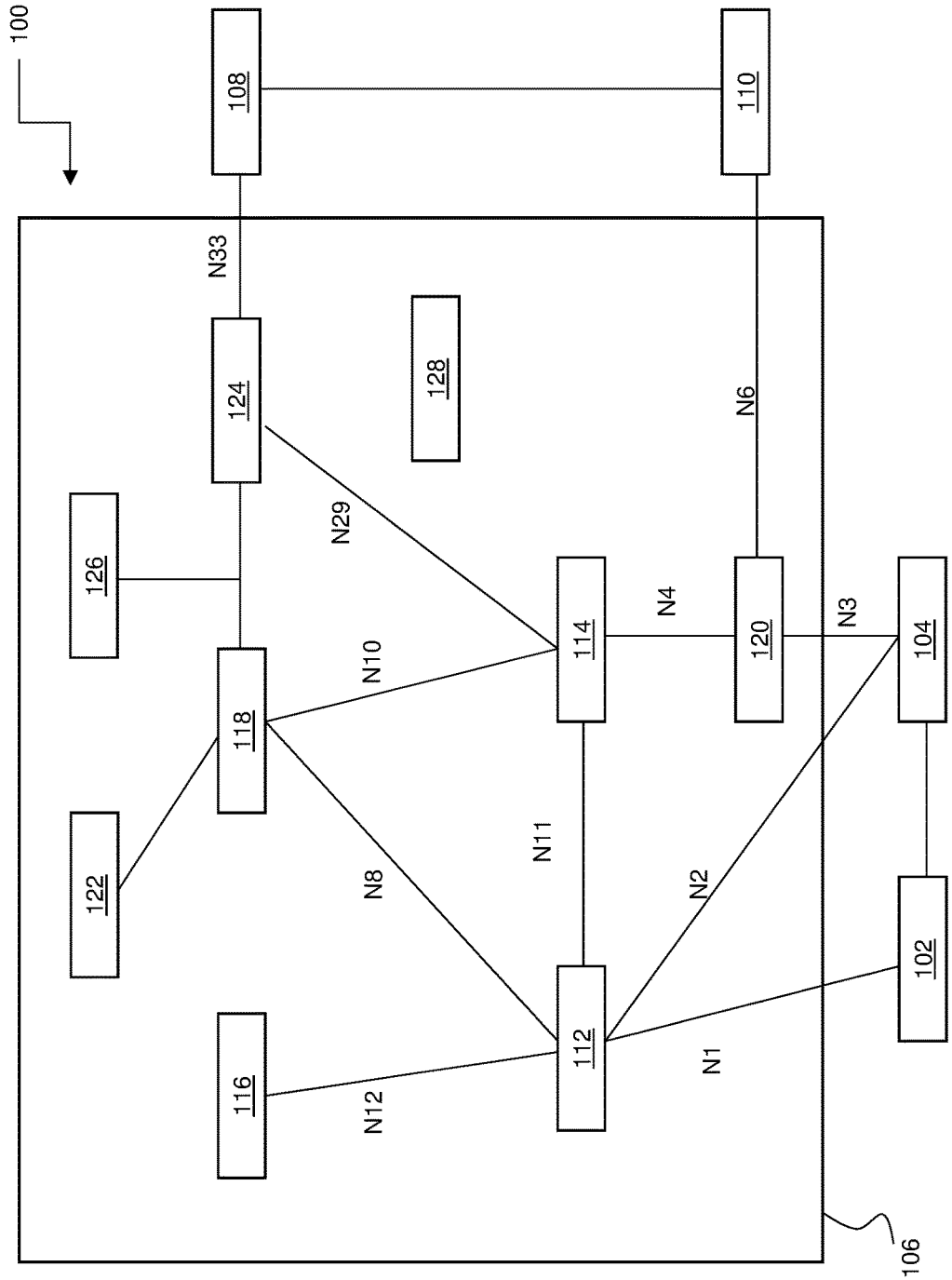
FIG. 1 shows a schematic representation of a 5G system.

FIG. 1 shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes.

The 5GC 106 may comprise one or more Access Management Functions (AMF) 112, one or more Session Management Functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. Although NRF 128 is not depicted with its interfaces, it is understood that this is for clarity reasons and that NRF 128 may have a plurality of interfaces with other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

The 5GC (5G Core) network has been defined as a Service Based Architecture (SBA). Service-Based Architectures provide a modular framework from which common applications can be deployed using components of varying sources and suppliers, with a Service Based Interface representing how a set of services is provided/exposed by a Network Function in 5G. Control plane functionality and common data repositories of a 5G network may thus be delivered by way of a set of interconnected Network Functions (NFs), each with authorization to access each other's services, with Network Function (NF) service producers exposing services to NF service consumers. NFs may act as service consumers and/or service providers. NF service providers register their NF profile in a Network Repository Function (NRF). An NRF maintains an updated repository of 5G elements available in the operator's network, along with the services provided by each of the elements in the 5G core that are expected to be instantiated, scaled and/or terminated without or minimal manual intervention. In other words, the NRF maintains a record of available NF instances and their supported services. An NF instance may be considered to be an identifiable software instance running on dedicated hardware, or in virtualised platform, e.g on the cloud. The NRF allows other NF instances to subscribe and be notified of registrations from NF instances of a given type. The NRF may support service discovery, by receipt of Discovery Requests from NF instances and details which NF instances support specific services. Therefore NF Service consumers or Service Communication Proxies (SCP) (which obtain NF services on behalf of another network entity) may discover NF service producers by performing for example, an NF Discovery procedure towards the NRF.

Resiliency of Network Function services in 5G SBA) is supported by the concept of Network Function set and Network Function service set. A Network Function set and a Network Function service set each comprise functionally equivalent and inter-changeable Network Function instances or Network Function services instances. This means that if a Network Function fails or fails to provide a particular service, a replacement may be readily determined from the Network Function set and Network Function service set respectively. This has been supported by functionality comprised in the AMF from 3GPP Rel-15 onwards, and supported by other types of Network Functions from 3GPP Rel-16 onwards.

When the Network Function is a Charging Function, the resiliency of Network Function services in 5G Service Based Architecture is also supported by the concept of primary and secondary Charging Function instances or Charging Function service instances (from 3GPP Rel-15 onwards). In other words, resiliency of Charging Function services can be supported by deploying a pair of primary and secondary Charging Function instances, whereby the secondary Charging Function instance can take over the control of charging for charging sessions supported by the primary Charging Function instance when the latter is no longer reachable or available. Resiliency of Charging Function services can be supported by deploying a pair of primary and secondary Charging Function service instances, whereby the secondary Charging Function service instance can take over the control of charging for charging sessions supported by the primary Charging Function service instance when the latter is no longer reachable or available. In this latter case, the primary and secondary Charging Function service instances can be part of the same Charging Function instance or different Charging Function instances.

For deployments with Network Function sets or Network Function service sets, a service response sent from an Network Function service producer to a Network Function service consumer may comprise binding information that tells the Network Function service consumer that any alternative Network Function service instance in the Network Function set or Network Function service set may be selected if the originally selected Network Function service instance becomes no longer reachable.

3GPP Rel-16 has also introduced the concept of Indirect Communication between a Network Function service consumer and a Network Function service producer (see 3GPP TS 23.501, 23.502 and 29.500). When the Network Function service Consumer uses Indirect Communication with Delegated Discovery (see 3GPP TS 23.501 Annex E), the Service Communication Proxy performs the Network Function service Producer discovery and selection based on the discovery parameters received in the Service request and the Service Communication Proxy proxies then the service request towards the selected Network Function service producer. The Service Communication Proxy proxies the service response from the Network Function service Producer towards the Network Function service Consumer. The Service Communication Proxy communicates the selected Network Function service Producer instance ID to the Network Function service Consumer by including a specific header in the service response (labelled as "3gpp-Sbi-Producer-Id" in 3GPP TS 29.500 section 6.10.3.4). This specific header is defined to only contain the Network Function instance ID of the Network Function service producer, and not the Network Function service instance ID. The Network Function service Consumer can use the Producer Instance ID for application specific use cases. For example, an AMF that consumes the SMF PDUSession service of the SMF using model D for SMF discovery and selection, may select the same SMF when the UE establishes additional PDU sessions.

With SBI-based Charging services in 5GS, one option discovering Charging Functions is via a Network Repository Function. This Charging Function discovery (and later selection of a Charging Function) can be delegated to a Service Communication Proxy (see 3GPP TS 23.501 section 6.3.11 Charging Function Discovery and selection) on behalf of a Charging Function consumer. This process is referred to as delegated discovery.

In delegated discovery, the Charging Function consumer may be, for example, a Short Message Service Function (SMSF), an SMF, a PCF, or AMF. When using the Service and Communication Proxy for discovery purposes, the Charging Function consumer may provide various discovery parameters to the Service and Communication Proxy. Discovery parameters may include, for example the Subscriber Permanent Identity (SUPI) for the subscriber receiving the service, the Charging Function group ID, etc. In response to receiving such discovery parameters in a service request, the Service Communication Proxy then performs the Charging Function Discovery with the Network Repository Function using the provided discovery parameters. The Service Communication Proxy may then select a specific Charging Function service instance returned by the Network Repository Function for forwarding to the Charging Function consumer. This selection may be based on at least one of a plurality of different factors. For example, the selection may be based on priority, capacity and load of all the candidate Charging Function service instances returned by the Network Repository Function.

There are several problems associated with such a mechanism.

For example, when a Charging Function service consumer uses delegated discovery, no means exists to enable the Service Communication Proxy or the Charging Function to return in the service response the identity of the alternate (e.g. secondary) Charging Function instance. This means that if the Charging Function service consumer can no longer reach the Charging Function instance originally selected by the Service Communication Proxy, the Charging Function service consumer would need to re-perform a discovery process. In other words, the Charging Function service consumer would need to send a new Network Function discovery request towards the Network Repository Function to retrieve the Network Function profile of the Charging Function instance originally selected by the Service Communication Proxy, solely for the purpose of discovering the alternative (e.g. secondary) Charging Function instance registered in the Network Function profile of the Charging Function instance originally selected by the Service Communication Proxy.

This is weaker than what exists with the concept of Network Function (service) sets, for which means exist to return in the service response the identity of the Network Function (service) set the Network Function service producer instance pertains to.

As another issue, when a Charging Function service consumer uses delegated discovery, no means exist to enable the Charging Function service consumer to determine the alternative (e.g. secondary) Charging Function service instance to use if it cannot reach the Charging Function service instance originally selected by the Service Communication Proxy. This is especially disadvantageous when resiliency of Charging Function services is supported by deploying a pair of primary and secondary Charging Function service instances.

Generally, a Network Function service producer registers Network Function type specific information in its Network Function Profile in the Network Repository Function. This Network Function type specific information is usually labelled as "xxxInfo" attribute in 3GPP communication protocols, e.g. amfInfo, smfInfo, udmInfo, chfInfo, etc. If necessary, this information can be retrieved by a Network Function service consumer from the Network Repository Function by issuing a Network Function Discovery request with a query parameter set to the Network Function instance ID. An Network Function service producer can also register multiple service instances in its Network Function profile, however the Network Function type specific information is common for all the service instances. So, it is sufficient for a Network Function service Consumer to retrieve the Network Function type specific information with the Network Function Instance ID.

However Charging services (e.g. nchf-convergedcharging, nchf-offlineonlycharging) provided by Charging Function (Network Function Type) are special services include Network Function type specific information both at Network Function and at Network Function service instance level. For example, the Charging Function profile may comprise chfInfo at the profile level and chfServiceInfo per service instance. 3GPP TS 29.510 section 6.2.6.2.4 defines Network Function Service which includes chfServiceInfo specific data for a Charging Function service instance. 3GPP TS 29.510 table 6.1.6.2.33-1 defines the ChfServiceInfo. This is reproduced below.

TABLE 1

Definition of ChfServiceInfo

| Attribute name | Data type | P | Cardinality | Description |
| --- | --- | --- | --- | --- |
| primaryChfService Instance | string | C | 0 ... 1 | This Information Element is present if the Charging Function service instance serves as a secondary Charging Function instance of another primary Charging Function service instance. When present, it is set to the serviceInstanceId of the primary Charging Function service instance. This Information Element shall be absent if the secondaryChfServiceInstance is present. |
| secondaryChfServi ceInstance | string | C | 0 ... 1 | This Information Element is present if the Charging Function service instance serves as a primary Charging Function instance of another secondary Charging Function service instance. When present, it is set to the serviceInstanceId of the secondary Charging Function service instance. This Information Element is absent if the primaryChfServiceInstance is present. |

When a Charging Function service consumer performs Network Repository Function-based Charging Function selection with delegated discovery, the Charging Function service consumer does not know which specific Charging Function service instance has been selected by the Service Communication Proxy. As a result, the Charging Function service consumer is not aware of the ChfServiceInfo corresponding to the Charging Function Service Instance ID selected by Service Communication Proxy. This means that the Charging Function service consumer cannot determine the alternative Charging Function service instance towards which it should attempt to communicate which if it can no longer reach the Charging Function service instance originally selected by the Service Communication Proxy e.g. by sending a Charging Data Request [Update] or Charging Data Request[Terminate] message.

The following proposes to address at least one of these issues. In particular, the following proposes using at least one of the Service Communication Proxy (or some other network function) and Charging Function to provide the identity of the alternate Charging Function (Service) Instance ID to the Charging Function service Consumer. For brevity and clarity, the following will refer to a Service Communication Proxy. However, it is understood that the presently described techniques may also be applied to other network functions. The Service Communication Proxy and/or Charging Function may provide this alternate identifier by, for example, using a new field in a header (or a new header). This header may include the alternate Charging Function instance ID and/or Charging Function service instance ID. For convenience, the new header/header comprising the new information element will be referred to as a 3GPP SBI custom header 3gpp-Sbi-Alternate-Chf-Id in the following. However, it is understood this this is not limiting.

The 3gpp-Sbi-Alternate-Chf-Id header may be returned by the Charging Function or by the Service Communication Proxy in service responses to the Charging Function service consumers, e.g. during the establishment of a charging session, or e.g. during the lifetime of the charging session if the information about the alternate Charging Function instance or Charging Function service instance has changed.

When the Charging Function service consumer can no longer reach the Charging Function service instance originally selected by the Service Communication Proxy, the Charging Function service consumer can send or repeat requests towards the alternate Charging Function instance and/or Charging Function service instance indicated in the 3gpp-Sbi-Alternate-Chf-Id header it received from the Charging Function.

Specific example forms that the 3gpp-Sbi-Alternate-Chf-Id header could take are now considered.

The 3gpp-Sbi-Alternate-Chf-Id header may comprise the identity of secondary CHF (Service) Instance. The 3gpp-Sbi-Alternate-Chf-Id header may comprise a Network Function Instance ID (as defined in 3GPP TS 29.510). The 3gpp-Sbi-Alternate-Chf-Id header may comprise a Network Function Service Instance ID (as defined in 3GPP TS 29.510). The 3gpp-Sbi-Alternate-Chf-Id header may be encoded. For example, the encoding may follow the augmented Backus-Naur form (ABNF) of encoding, which is defined in IETF RFC 7230.

Some potential parts of the 3gpp-Sbi-Alternate-Chf-Id header in different situations is considered in the following examples.

As a first example, the case of a Charging Function service resiliency being supported by deploying a pair of primary and secondary Charging Function instances is considered. In this case, the 3gpp-Sbi-Alternate-Chf-Id header may comprise the identity of secondary CHF (Service) Instance, and a Network Function Instance ID. The 3gpp-Sbi-Alternate-Chf-Id header may not comprise a Network Function Service Instance ID.

As a second example, the case of a Charging Function service resiliency being supported by deploying a pair of primary and secondary Charging Function service instances is considered. In this case, the 3gpp-Sbi-Alternate-Chf-Id header may comprise the identity of secondary CHF (Service) Instance, a Network Function Instance ID, and a Network Function Service Instance ID.

The header may also indicate whether the Charging Function instance or Charging Function service instance ID included in the header corresponds to the primary or secondary Charging Function instance. This is shown in the following examples.

In this third example, the 3gpp-Sbi-Alternate-Chf-Id header may indicate that the Charging Function (service) instance included in the header corresponds to the primary Charging Function (service) instance. In such a case, the 3gpp-Sbi-Alternate-Chf-Id header may comprise the identity of secondary CHF (Service) Instance, a Network Function Instance ID, and an indication that the Network Function is a primary Function. Optionally, the header may comprise a Network Function Service Instance ID.

In this third example, the charging session may be established towards the secondary Charging Function (service) instance by the Service Communication Proxy when the primary Charging Function (service) instance becomes unreachable.

As a fourth example, the 3gpp-Sbi-Alternate-Chf-Id header may indicate that the Charging Function (service) instance included in the header corresponds to the secondary Charging Function (service) instance. In such a case, the 3gpp-Sbi-Alternate-Chf-Id header may comprise the identity of secondary CHF (Service) Instance, a Network Function Instance ID, and an indication that the Network Function is a secondary Function. Optionally, the header may comprise a Network Function Service Instance ID.

In this fourth example, the charging session may be established towards the primary Charging Function (service) instance by the Service Communication Proxy.

Figure 5:
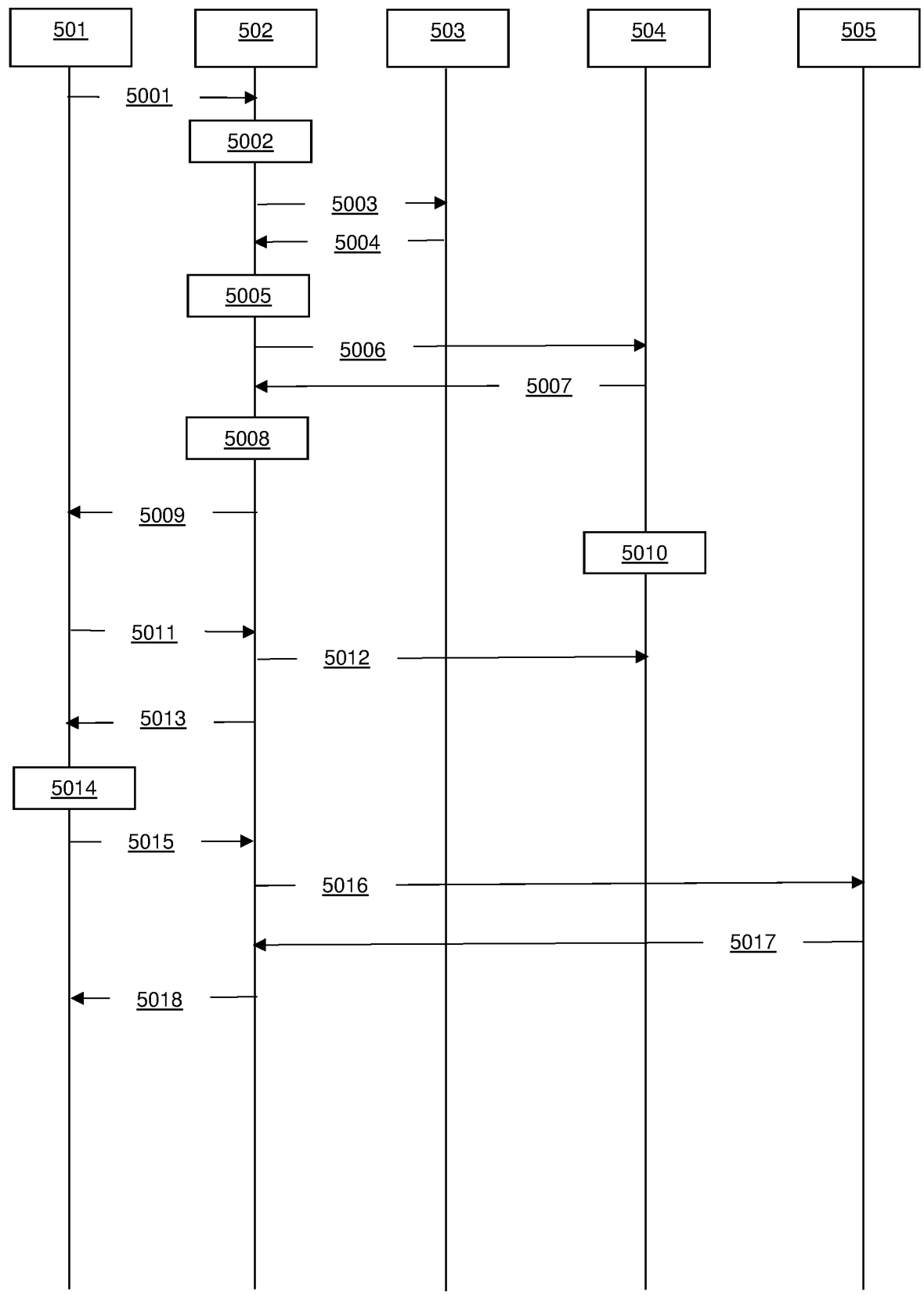
FIGS. 5 and 6 are signalling diagrams illustrating potential call flows.
Figure 6:
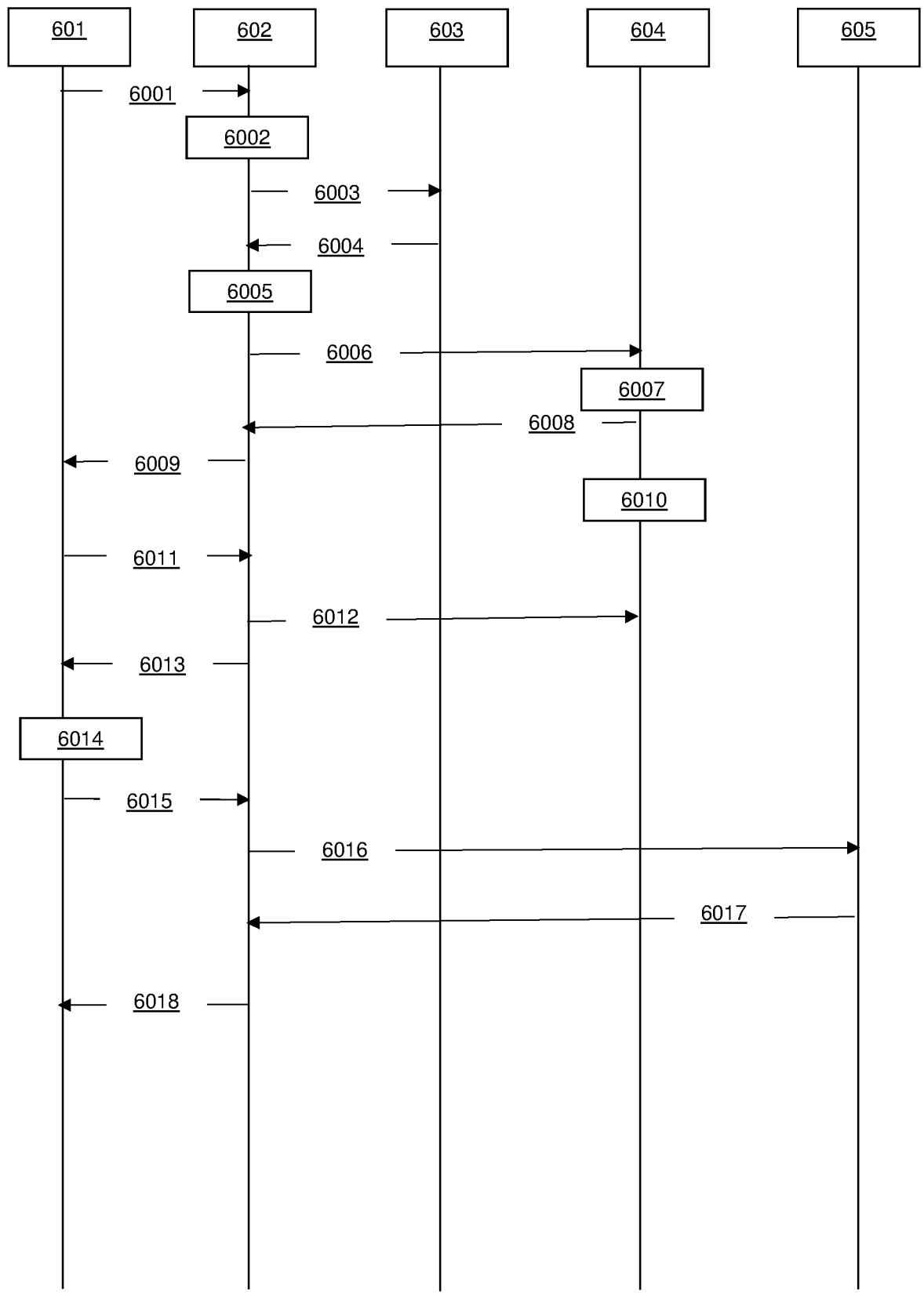

FIGS. 5 and 6 illustrate potential call signalling between network elements.

FIG. 5 shows an example signaling between a Network Function service consumer 501, a Service Communication Proxy 502, a Network Repository Function 503, a first Charging Function 504 and a second Charging Function 505.

At 5001, the Network Function service consumer 501, sends a Charging Data Request to the Service Communication Proxy 502. The Charging Data Request may be an initial request, and may request information on a Charging Function for a service to be provided.

At 5002, in response to the request received at 5001, the Service Communication Proxy 502 performs Charging Function Discovery.

As part of this Discovery process, at 5003 the Service Communication Proxy 502 sends a Discovery Request to the Network Repository Function 503.

At 5004, the Network Repository Function responds to the Discovery request of 5003.

At 5005, the Service Communication Proxy 502 selects a Charging Function from a plurality of Charging Functions provided in the response of 5004. In the present case, the Service Communication Proxy 502 selects the first Charging Function 504. The Service Communication Proxy 502 also determines that the first Charging Function 504 is indicated as having an alternate partner Charging Function (the second Charging Function 505 in the present case). The Service Communication Proxy 502 therefore stores identifiers of both the first and second Charging Functions with the service instance identifier for the Network Function service consumer 501.

At 5006, the Service Communication Proxy 502 sends an initial charging request to the first Charging Function 504.

At 5007, the Service Communication Proxy 502 receives a response to the initial charging request of 5006 from the first Charging Function. The response may indicate that the request of 5006 was a success. The header of this message may comprise the address of the first Charging Function 504.

At 5008, the Service Communication Proxy 502 checks the response received at 5007 to determine that it does not comprise an SBI-based binding header. Such a binding header indicates resiliency information via the network function set and network function service set concepts. When it does not comprise an SBI-based binding header, the Service Communication Proxy 502 adds the alternate Charging Function instance identifier (and service instance identifier if applicable) of 5005 for the second Charging Function to the header for forwarding at 5009.

At 5009, the Service Communication Proxy 502 sends a charging data response message to the Network Function service consumer 501. This response may indicate that the Charging Function request of 5001. This response may comprise the address of the first Charging Function 504. This response may comprise the alternate Charging Function instance identifier (and service instance identifier if applicable) of 5005 for the second Charging Function 505.

At 5010, the first Charging Function 504 becomes unable to perform functions for the Network Function service consumer 501.

At 5011, the Network Function service consumer sends a charging data request (e.g. an update request) to the Service Communication Proxy 502. This charging data request may comprise the address of the first Charging Function.

At 5012, the Service Communication Proxy 502 forwards the request of 5011 to the first Charging Function 504.

At 5013, in response to not receiving a response to the request of 5012 (or otherwise determining that the first Charging Function 504 is in an error state), the Service Communication Proxy 502 responds to the request of 5011 by indicating that there was an error in delivering the request to the first Charging Function 504.

In response to the message of 5013, at 5014 the Network Function service consumer 501 determines to re-send the charging request message of 5011, but to change the address of the Charging Function comprised in the charging request message to that of the second Charging Function 505.

At 5015, the Network Function service consumer 501 sends a new charging request (e.g. update) message to the Service Communication Proxy 502. This new request comprises the address of (or an identifier of) the second Charging Function 505.

At 5016, the Service Communication Proxy 502 forwards the request received at 5015 to the second Charging Function 505.

At 5017, the Service Communication Proxy 502 receives, from the second Charging Function 505, a response to the request of 5016.

At 5018, the Service Communication Proxy 502 sends a charging data response to the Network Function service consumer in response to the request of 5015. This response indicates that the update was made successfully.

FIG. 6 shows an example signaling between a Network Function service consumer 601, a Service Communication Proxy 602, a Network Repository Function 603, a first Charging Function 604 and a second Charging Function 605.

At 6001, the Network Function service consumer 601, sends a Charging Data Request to the Service Communication Proxy 602. The Charging Data Request may be an initial request, and may request information on a Charging Function for a service to be provided by the Network Function service consumer.

At 6002, in response to the request received at 6001, the Service Communication Proxy 602 performs Charging Function Discovery.

As part of this Discovery process, at 6003 the Service Communication Proxy 602 sends a Discovery Request to the Network Repository Function 603.

At 6004, the Network Repository Function responds to the Discovery request of 6003.

At 6005, the Service Communication Proxy 602 selects a Charging Function from a plurality of Charging Functions provided in the response of 6004. I At 6006, the Service Communication Proxy 602 sends an initial charging request to the first Charging Function 604.

At 6007, the first Charging Function 604 adds an identifier of an alternate partner Charging Function (the second Charging Function 605 in the present case) to a header for responding to the charging request of 6006.

At 6008, the first Charging Function 604 responds to the charging request of 6006. This response comprises an identifier for the second Charging Function 605. Where applicable, an identifier for the service instance of the second Charging Function 605 may also be comprised within the response.

At 6009, the Service Communication Proxy 602 response to the charging data request of 6001. The response comprises the identifier for the second Charging Function 605. Where applicable, an identifier for the service instance of the second Charging Function 605 may also be comprised within the response, as well as an identifier for the first Charging Function (and/or service instance of the first Charging Function).

At 6010, the first Charging Function 604 becomes unable to perform functions for the Network Function service consumer 601.

At 6011, the Network Function service consumer 601 sends a charging data request (e.g. an update request) to the Service Communication Proxy 602. This charging data request may comprise the address of the first Charging Function 604.

At 6012, the Service Communication Proxy 602 forwards the request of 6011 to the first Charging Function 604.

At 6013, in response to not receiving a response to the request of 6012 (or otherwise determining that the first Charging Function 604 is in an error state), the Service Communication Proxy 602 responds to the request of 6011 by indicating that there was an error in delivering the request to the first Charging Function 604.

In response to the message of 6013, at 6014 the Network Function service consumer 601 determines to re-send the charging request message of 6011, but to change the address of the Charging Function comprised in the charging request message to that of the second Charging Function 605.

At 6015, the Network Function service consumer 601 sends a new charging request (e.g. update) message to the Service Communication Proxy 602. This new request comprises the address of (or an identifier of) the second Charging Function 605.

At 6016, the Service Communication Proxy 602 forwards the request received at 6015 to the second Charging Function 605.

At 6017, the Service Communication Proxy 602 receives, from the second Charging Function 605, a response to the request of 6016.

At 6018, the Service Communication Proxy 602 sends a charging data response to the Network Function service consumer 601 in response to the request of 6015. This response indicates that the update was made successfully.

Figure 9:
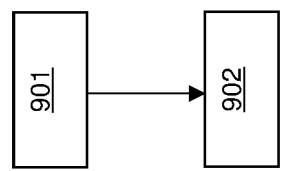
FIGS. 7 to 9 illustrate flows performed by example apparatus.
Figure 8:
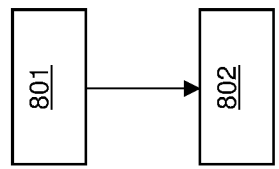
Figure 7:
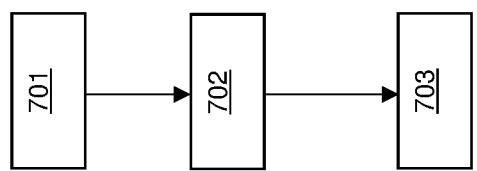

FIGS. 7 to 9 are flowcharts illustrating potential actions that may be performed by at least some of the entities described above.

FIG. 7 illustrates actions that may be performed by a network apparatus for a network function. The network function may be, for example, a Service Communication Proxy.

At 701, the network apparatus, in response to a request from a service consumer, determines a first charging function for providing charging services to the service consumer.

At 702, the network apparatus determines an identity of a second charging function. The second charging function is an alternative or backup charging function to provide the charging service to the service consumer. In other words, the second charging function may provide charging services provided by the first charging function when the first charging function is unable to. It is understood that the term "charging function", when used in the present case, may encompass charging service instances.

The determining the identity of the second charging function may comprise sending a discovery request for a charging function to a network repository function, and receiving, from the network repository function, at least the identity of the first charging function, the identity of the second charging function, and an indication that the second charging function is an alternative to the first charging function.

The determining the second charging function may comprise sending a charging request for said charging services to the first charging function, and receiving, from the first charging function, the identity of the second charging function, and an indication that the second charging function is an alternative charging function for the said charging services.

At 703, the network apparatus provides the service consumer with the identity of the second charging function.

The providing the service consumer with the identity of the first charging function and the identity of the second charging function may comprise: inserting the identity of the second charging function into a header of a message, the header further comprising the identity of the first charging function, and sending the message to the service consumer. Said message may be a charging data response received from the first charging function. The identity of the second charging function may be explicitly indicated as being a backup (or alternate) charging function to the first charging function in said header.

The network apparatus may provide the service consumer with an identity of the first charging function.

FIG. 8 is a flow chart illustrating potential operations of a network apparatus for a service consumer. The service consumer may be a network function (e.g. core network function) that interacts with the network apparatus/network function of FIG. 7.

At 801, the network apparatus sends a request to a network function for selecting a first charging function to provide charging services to the service consumer.

At 802, the network apparatus receives, in response to said request, an identity of a second charging function, wherein the second charging function is an alternative or backup charging function to provide the charging service to the service consumer.

Said identity of a second charging function may be comprised within a header of the response to said request. The second charging function may be explicitly indicated as being a backup charging function to the first charging function in said header. In other words, the second charging function may be explicitly indicated as being usable in the event that the first charging function can no longer provide a requested service to the service consumer. The response may comprise an identity of the first charging function. The identity of the first charging function may be comprised in a header of the response to said request.

The network apparatus may receive an indication that the first charging function is unable to provide said charging services to the service consumer. In response to receiving said indication, the network apparatus may direct at least one future request for a charging service to the second charging function.

FIG. 9 is a flow chart illustrating potential actions of a network apparatus for a first charging function. This first charging function may interact with at least one of the network function of FIG. 7 and the service consumer of FIG. 8.

At 901, the network apparatus receives, from a function, a request to provide services to a service consumer.

At 902, the network apparatus responds to said request with an identity of a second charging function, wherein the second charging function is an alternative or backup charging function to provide the charging service to the service consumer.

The identity of the second charging function may be comprised in a header. An identity of the second charging function may be comprised in a header. The identity of the first charging function and the identity of the second charging function may be comprised in the same header.

The presently described mechanisms may be advantageous in that they allow for the introduction of network access node services consumed by core network functions when the UE is in a transition phase in which only some direct communication is enabled and the AMF knows the network access node from other interactions.

Figure 2:
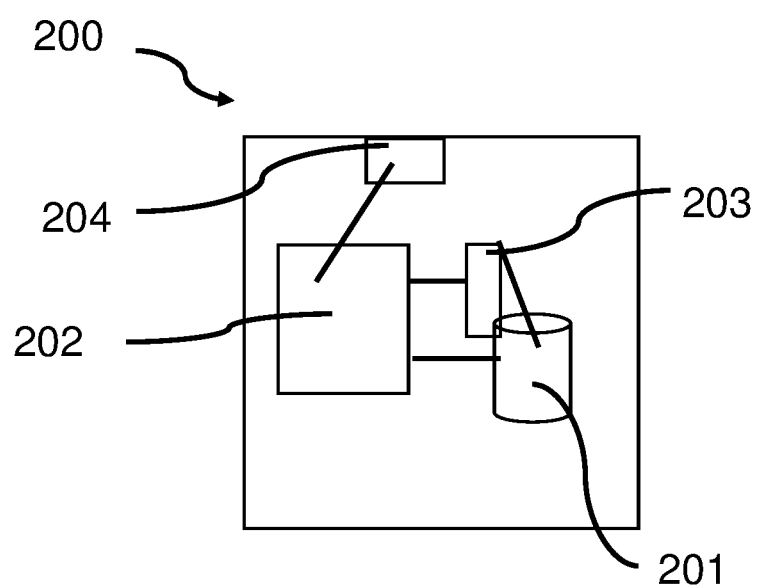
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR etc. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example the control apparatus 200 or processor 201 can be configured to execute an appropriate software code to provide the control functions.

Figure 3:
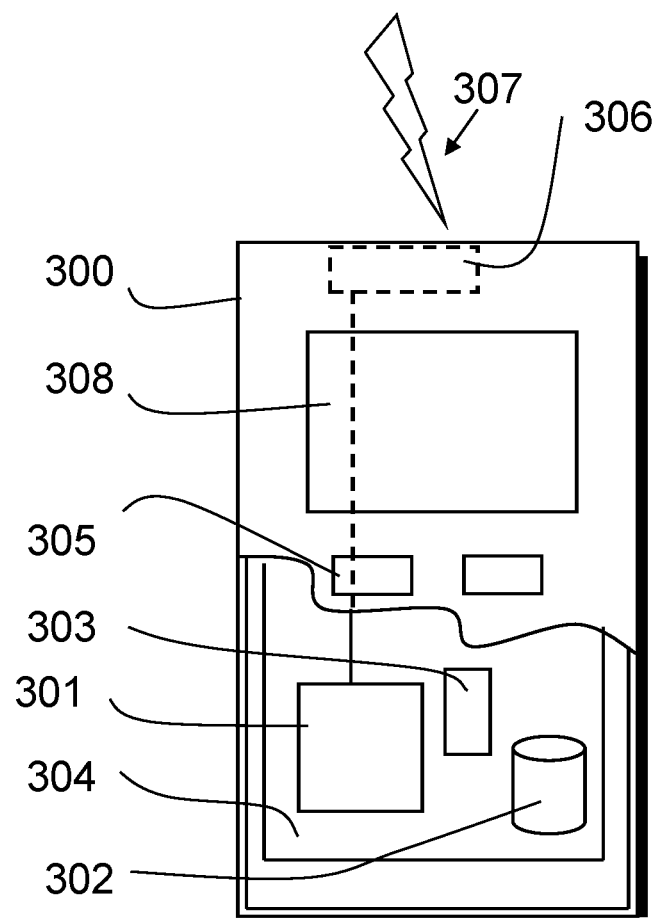
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 704. The user may control the operation of the wireless device by means of a suitable user interface such as key pad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
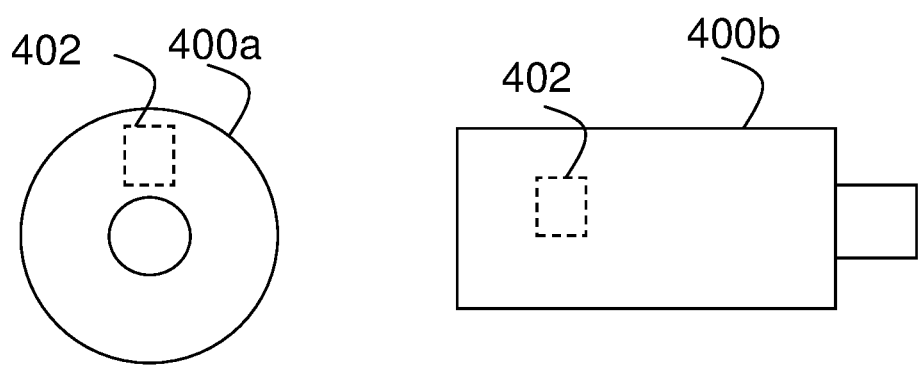
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400a (e.g. computer disc (CD) or digital versatile disc (DVD)) and 400b (e.g. universal serial bus (USB) memory stick) storing instructions and/or parameters 402 which when executed by a processor allow the processor to perform one or more of the steps of the methods of FIGS. 7 to FIG. 9.

It is noted that whilst the above examples are described with reference to charging services and charging functions, the same principles can also be applied to other network services and network service functions. Thus a first and a second network service function may be configured to provide other functions than a first and second charging function. The determining may comprise determining, instead of a first and a second charging function, determining another type of network service function.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 7 to FIG. 9, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (AStudy ItemC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
 (a) hardware-only circuit implementations (such as implementations in only analogue and/or digital circuitry);
 (b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. A network apparatus for a network function, the network apparatus comprising: at least one processor; and at least one memory comprising code of a service communication proxy that, when executed by the at least one processor, causes the network apparatus to perform:
   in response to receiving a request from a network function service consumer, discovering a plurality of network function service instances configured for providing one or more services and determining a first network function service instance configured for providing the one or more services to the network function service consumer;
   determining a second network function service instance, wherein the second network function service instance is an alternative or backup network function service instance configured to provide the one or more services to the network function service consumer; and
   sending a response to the request to the network function service consumer, the response comprising an identity of the second network function service instance.

2. A The network apparatus as claimed in claim 1, wherein the discovering comprises;
   sending, to a network repository function, a discovery request for discovering the plurality of network function service instances; and
   receiving, from the network repository function, the identity of the first network function service instance, the identity of the second network function service instance, and an indication that the second network function service instance is an alternative to the first network function service instance.

3. The network apparatus as claimed in claim 1, wherein the first network function service instance comprises at least a first charging function instance, and the second network function service instance comprises at least a second charging function instance, and the one or more services comprises a charging service.

4. The network apparatus as claimed in claim 3, the code, when executed by the at least one processor, further causes the network apparatus to perform:
   sending a charging request for said charging service to the first charging function instance; and
   receiving, from the first charging function instance, the identity of the second charging function instance, and an indication that the second charging function instance is an alternative charging function instance for the charging service.

5. A The network apparatus as claimed in claim 1, wherein the code, when executed by the at least one processor, further causes the network apparatus to:
   inserting the identity of the second network function service instance into a header of a message; and
   sending the message to the network function service consumer.

6. The network apparatus as claimed in claim 5, wherein the second network function service instance is explicitly indicated as being a backup network function service instance to the first network function service instance in said header.

7. The network apparatus as claimed in claim 5, wherein said message is a charging data response received from a first charging function instance.

8. A network apparatus, the network apparatus comprising: at least one processor; and at least one memory comprising code of a network function service consumer that, when executed by the at least one processor, causes the network apparatus to perform:
   sending a request to a service communication proxy for selecting a first network function service instance, the first network function service instance configured to provide one or more services to a network function service consumer;
   receiving, in response to said request, an identity of a second network function service instance, wherein the second network function service instance is an alternative or backup network function service instance configured to provide the one or more services to the network function service consumer.

9. The network apparatus as claimed in claim 8, wherein said identity of the first network function service instance and the identity of a second network function instance are comprised within a header of the response to said request.

10. The network apparatus as claimed in claim 9, wherein the second network function service instance is explicitly indicated as being a backup network function service instance to the first network function service instance in said header.

11. The network apparatus as claimed in claim 8, wherein the code, when executed by the at least one processor further causes the network apparatus to perform:
   receive an indication that the first network function service instance is unable to provide the one or more services to the network function service consumer; and
   in response to receiving said indication, directing at least one future request for the one or more services to the second network function service instance.

12. The network apparatus as claimed in claim 8, wherein the first network function service instance comprises at least a first charging function instance, the second network function-service instance comprises a second charging function instance, and the one or more services comprise a charging service.

13. A method for a network apparatus comprising a service communication proxy, the method comprising:
   in response to receiving a request from a network function service consumer, discovering a plurality of network function service instances configured for providing one or more services and determining a first network function service instance configured for providing the one or more services to the network function service consumer;
   determining a second network function service instance, wherein the second network function service instance is an alternative or backup network function service instance configured to provide the one or more services to the network function service consumer; and
   sending a response to the request to the network function service consumer, the response comprising with an identity of the second network function service instance.

14. The method as claimed in claim 13, wherein the discovering comprises:
   sending, to a network repository function, a discovery request for discovering the plurality of network function service instances; and
   receiving, from the network repository function, the identity of the first network function service instance, the identity of the second network function service instance, and an indication that the second network function service instance is an alternative to the first network function service instance.

15. The method as claimed in claim 13, wherein the first network function service instance comprises a first charging function instance, and a second network service function comprises first and a second charging function instance, and the one or more services comprises a charging service.

16. The method as claimed in claim 15, further comprising:
   sending a charging request for said charging service to the first charging function instance; and
   receiving, from the first charging function instance, the identity of the second charging function instance, and an indication that the second charging function instance is an alternative charging function instance for providing the charging service.

17. The method as claimed in claim 13, further comprising:
   inserting the identity of the second network function service instance into a header of a message; and
   sending the message to the network function service consumer.

18. A method as claimed in claim 17, wherein the second network function service instance is explicitly indicated as being a backup network function service instance to the first network function service instance in said header.

19. The method as claimed in claim 17, wherein said message is a charging data response received from first charging function instance.

* * * * *

UNITED STATES PATENT AND TRADEMARK OFFICE
CERTIFICATE OF CORRECTION

PATENT NO. : 12,160,482 B2
APPLICATION NO. : 17/571757
DATED : December 3, 2024
INVENTOR(S) : Prashanti Das et al.

It is certified that error appears in the above-identified patent and that said Letters Patent is hereby corrected as shown below:

In the Claims

In Column 19, Line 34, Claim 1, delete "apparatus for a network function," and insert -- apparatus, --, therefor.

In Column 19, Line 54, Claim 2, delete "A The" and insert -- The --, therefor.

In Column 19, Line 55, Claim 2, delete "comprises;" and insert -- comprises: --, therefor.

In Column 20, Line 15, Claim 5, delete "A The" and insert -- The --, therefor.

In Column 21, Line 19, Claim 13, delete "with an" and insert -- an --, therefor.

In Column 22, Line 6, Claim 15, delete "first and a" and insert -- a --, therefor.

Signed and Sealed this
Eleventh Day of February, 2025

Coke Morgan Stewart
*Acting Director of the United States Patent and Trademark Office*